(12) United States Patent
Sullivan

(10) Patent No.: US 10,438,512 B1
(45) Date of Patent: Oct. 8, 2019

(54) SKY DIAL

(71) Applicant: Michael John Sullivan, Hickory Hills, IL (US)

(72) Inventor: Michael John Sullivan, Hickory Hills, IL (US)

(*) Notice: Subject to any disclaimer, the term of this patent is extended or adjusted under 35 U.S.C. 154(b) by 68 days.

(21) Appl. No.: 15/924,194

(22) Filed: Mar. 17, 2018

(51) Int. Cl.
*G09B 29/00* (2006.01)

(52) U.S. Cl.
CPC ................... *G09B 29/00* (2013.01)

(58) Field of Classification Search
CPC ......... G09B 25/06; G09B 27/04; G09B 27/06
See application file for complete search history.

(56) References Cited

U.S. PATENT DOCUMENTS

| | | | | |
|---|---|---|---|---|
| 1,150,731 A | * | 8/1915 | Barcus | A45B 3/00 135/16 |
| 2,460,346 A | * | 2/1949 | Hagner | G01C 21/02 33/1 SA |
| 7,793,673 B2 | * | 9/2010 | Anello | G09B 27/02 135/33.2 |

* cited by examiner

*Primary Examiner* — Daniel Swerdlow

(57) ABSTRACT

The Sky Dial is a North Star based celestial observatory for measuring the position of celestial objects. This celestial observatory, when aimed at the North Star, creates a grid of stationary reference lines which divide the entire visible sky into near isosceles trapezoid shapes that can be identified by their grid coordinates, Ring Number and Hour Number. The Sky Dial allows people to observe celestial objects, and easily assign them a set of coordinates defining their current position. By comparing the grid positions of an object at different times, users can witness that all the stars rotate counter-clockwise around the North Star once every twenty-four hours, or 15 degrees per hour, and that distance from the North Star, called the ring, never changes. The Sky Dial can be used to measure the passage of time during the night just as a Sun Dial can do during the day.

6 Claims, 11 Drawing Sheets

SKY DIAL

CROSS-REFERENCE TO RELATED APPLICATIONS

None.

STATEMENT REGARDING FEDERALLY SPONSORED RESEARCH

None.

REFERENCE TO SEQUENCE LISTING

None

FIELD OF DISCLOSURE

Astronomy

BACKGROUND OF THE INVENTION

People have always looked up at the stars and wondered how they move across the sky. Astronomers know that the starts move counter clockwise around Polaris, also know as the North Star. They know that the stars make one trip around the North Star every 24 hours. That is of course due to the Earth's daily rotation.

But, if you ask the everyday person why the North Star is special, many will guess that it is because it is the brightest star in the sky or the nearest star. And, the have no idea that the other stars all rotate around the North Star as they do.

The problem is that the stars move so slowly that few people have the patience it takes to witness the motion of the stars for themselves.

To help others to understand this basic fact of nature, some people have taken time-lapse photos of the sky and then later used them to help people to understand. The pictures show circular trails of the stars as they encircle the North Star.

Planetariums like the Adler Planetarium in Chicago have built special theaters for showing movies of the night sky on a huge domed ceiling.

There exists computer software and apps that can simulate the motion of the stars over time.

But, the problem with the movies at the Adler Planetarium, the time lapse photos, and the computer apps is that they all require you to view something other than the sky. You must watch a movie, view a photo, or see a computer simulation. None of them allows the observer to look directly at the stars and observe their motion in real time.

This invention is the first instrument that allows people to observe celestial objects, and easily assign them a set of Hour Number and Ring Number coordinates defining their current position, and then observe them again later and assign them a second set of Hour Number and Ring Number coordinates in an effort to understand how far the celestial object has moved and in which direction.

Users of this invention will witness that the stars move counter-clockwise around the North Star. For every hour that passes, the Hour Number as measured by this invention changes by exactly one, while the Ring Number remains constant. In that way, the Sky Dial can be used to measure the passage of time by looking at the stars at night, just as a Sun Dial can be used measure the passage of time during the day. Users of this invention will also witness that the North Star is the only star that never moves.

SUMMARY OF THE INVENTION

A device for observing and identifying the position of stars, planets and other celestial objects using a grid of crosshairs formed by the invention and a designated viewing point that acts to establish a vantage point.

This invention strives to help a person to understand the motion of celestial objects.

Some clarifications of terms and phrases: The Earth is spinning. The Earth, the Sun, the Moon, the planets, and stars are all moving through space at all times. Throughout this document, the phrase "the motion of the celestial object" is intended to mean "the relative motion of the celestial object as perceived from the surface of the Earth in the Northern Hemisphere".

The invention in it's most general form is a plurality of equal length structures extending outward from one originating point in space or a ring encircling that point, and fanned out at 15 degree intervals, and returning to one terminating second point in space or a ring encircling that point, and having an identified third point known as the viewing point at a fixed position between the originating point and the terminating point such that all three points are in line with one another.

When the 3 points are aligned with the North Star, a person gazing through the viewing point can observe celestial objects and measure their position based on which of the invention's structures they appear between. Repeating this exercise at different times allows the person to notice that the celestial object has moved, how far it has moved, and how fast it has moved.

Most people know that the stars appear to move throughout the night. But few can explain the patterns or directions in which they move. Astronomers know that in the Northern Hemisphere celestial objects appear to move counter-clockwise around the North Star. But the stars move slowly, and without any stationary point of reference witnessing star movement without the use of the invention described herein is a tedious endeavor that most people do not have the patience to undertake.

This invention creates a set of stationary grid lines of reference that divide the visible sky into isosceles trapezoid like shapes that can be identified by their position in the grid. This invention allows a person to recognize and identify a grid position of a celestial object at multiple points in time, and then use those readings to compute how much time has passed between observations.

DETAILED DESCRIPTION OF THE INVENTION

Figure 1:
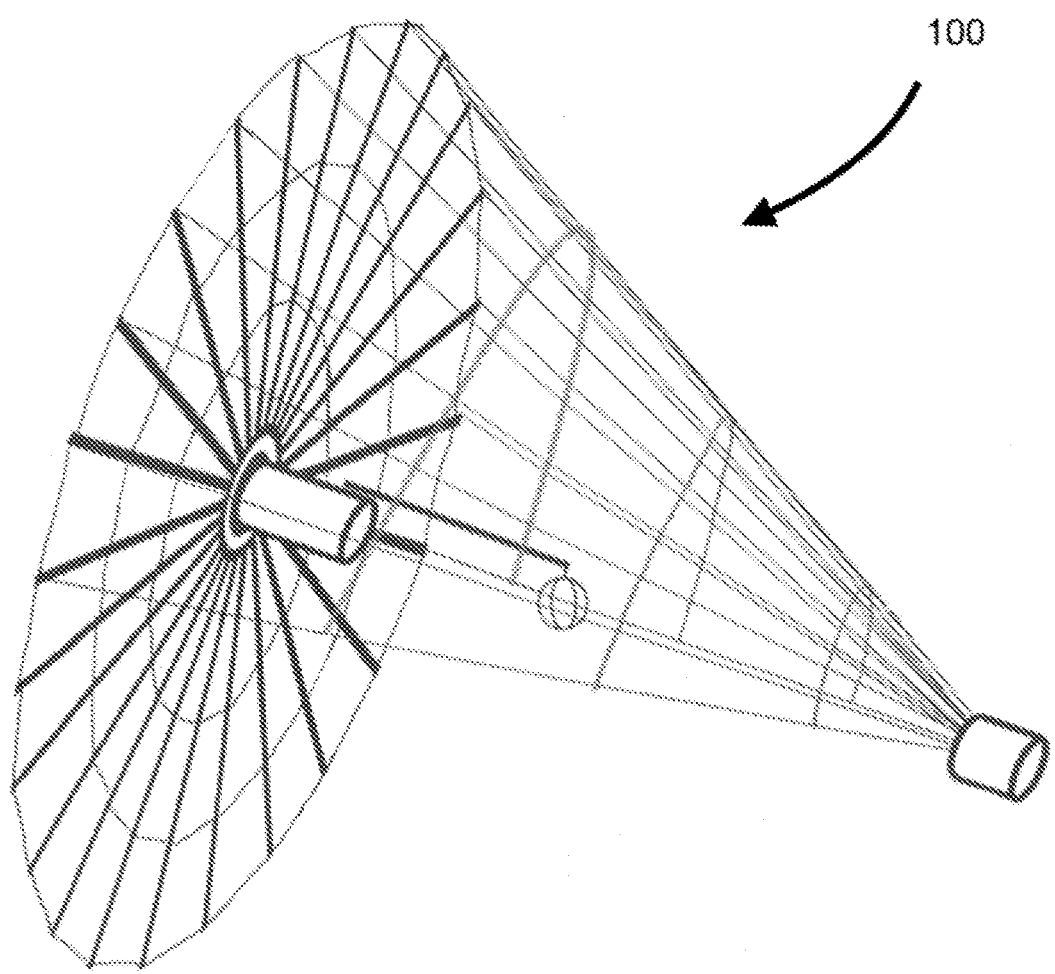
FIG. 1 is a full view of the preferred embodiment of the Sky Dial 100 according to the invention.
Figure 2:
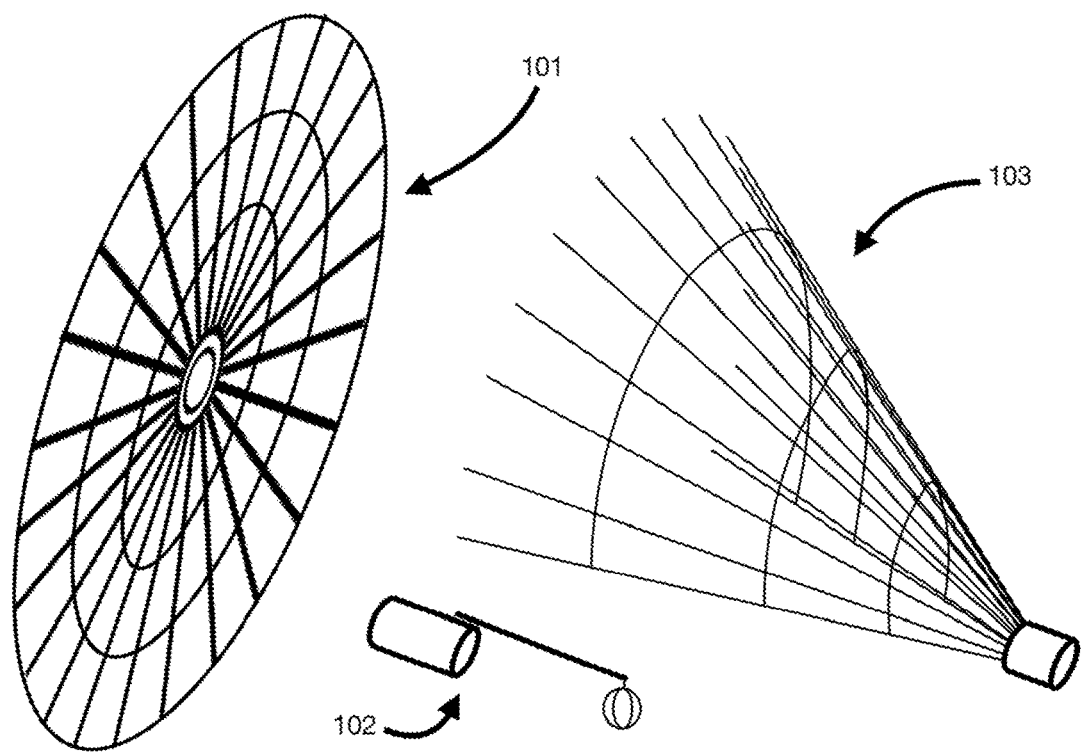
FIG. 2 is an exploded view of the Sky Dial, breaking the invention into three assemblies, the wheel 101, the viewing assembly 102, and the conical net 103.
Figure 3:
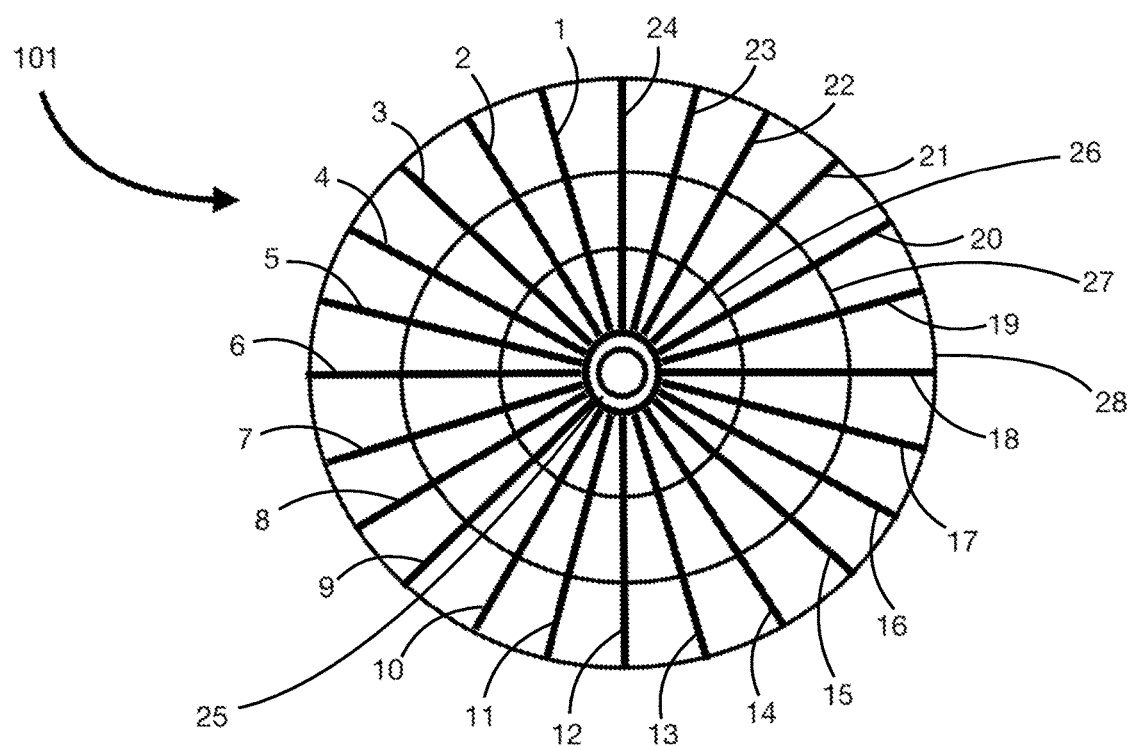
FIG. 3. is a partial view of FIG. 1. detailing the wheel 101, wherein a tube collar 25 forms the center core of a wheel 101 with twenty-four hour spokes 1-24. The hour spokes 1-24 are evenly spaced at 15 degrees intervals around the tube collar 25 (24×15=360). Three wheel cross strings 26, 27, 28 encircle the tube collar 25 and connect to each of the twenty-four hour spokes 1-24 creating three rings of space with each ring being divided into 24 by the hour spokes 1-24. So the space of the wheel 101 is divided into seventytwo near isosceles trapezoid shaped spaces and one circle formed by the inside of the tube collar 25.
Figure 4:
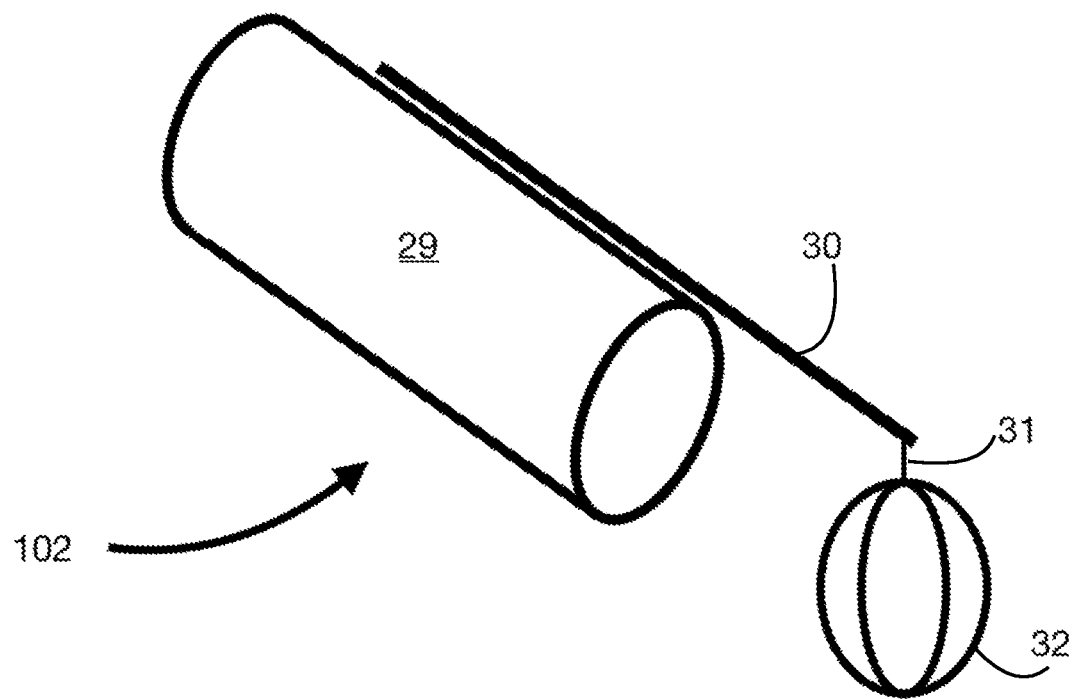
FIG. 4. is a partial view of FIG. 1. detailing the viewing assembly 102 wherein the viewing ball 32 is formed by two crossed rings suspended from a support string 31 attached to a viewing ball support stick 30 which is firmly attached to the aiming tube 29 such that when the aiming tube 29 is rotated to position the viewing ball support stick 30 to it's highest point, the viewing ball 32 hangs directly in line with the aiming tube 29.
Figure 5:
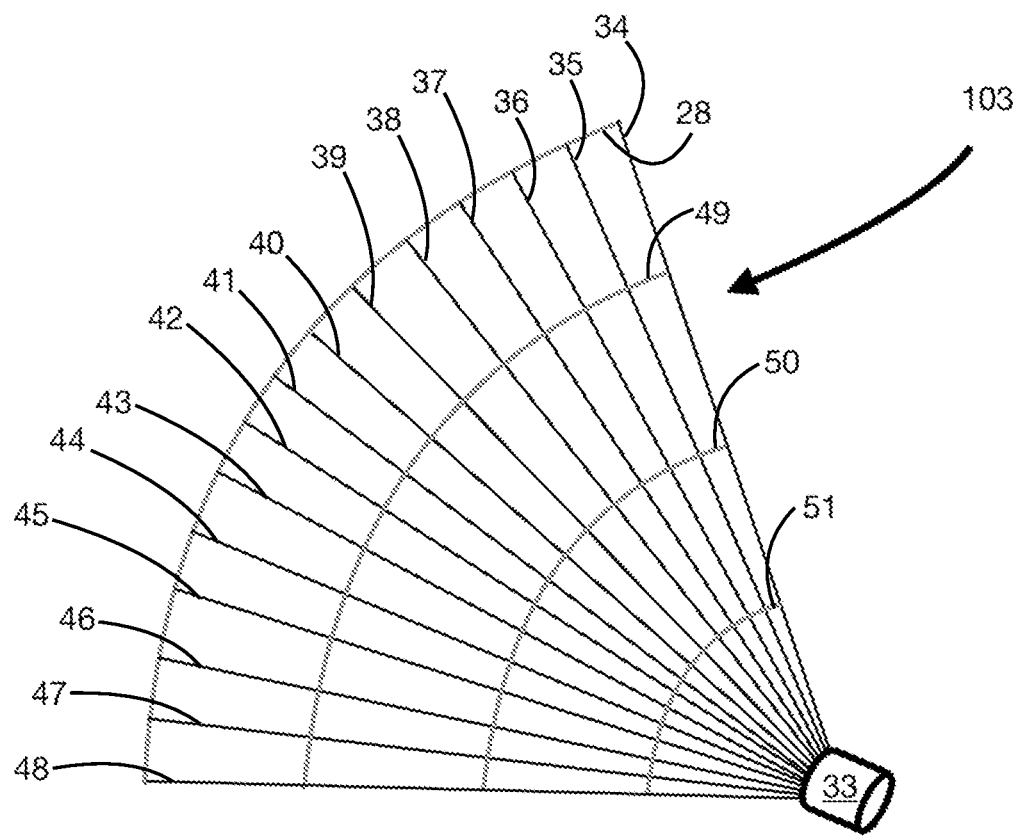
FIG. 5. is a partial view of FIG. 1. detailing the conical net 103, formed by fifteen hour strings 34-48. All of the hour strings 34-48 are attached at one end to the vertex tube 33. The outer wheel cross string 28 is shown here along with three conical net cross strings 49, 50, 51 all of which extend between each of the fifteen hour strings 34-48. So the space of the conical net 103 is divided into fifty-six (14×4) isosceles trapezoid like shapes, and one circle formed by the circle inside of the vertex tube 33. Better Drawing?
Figure 6:
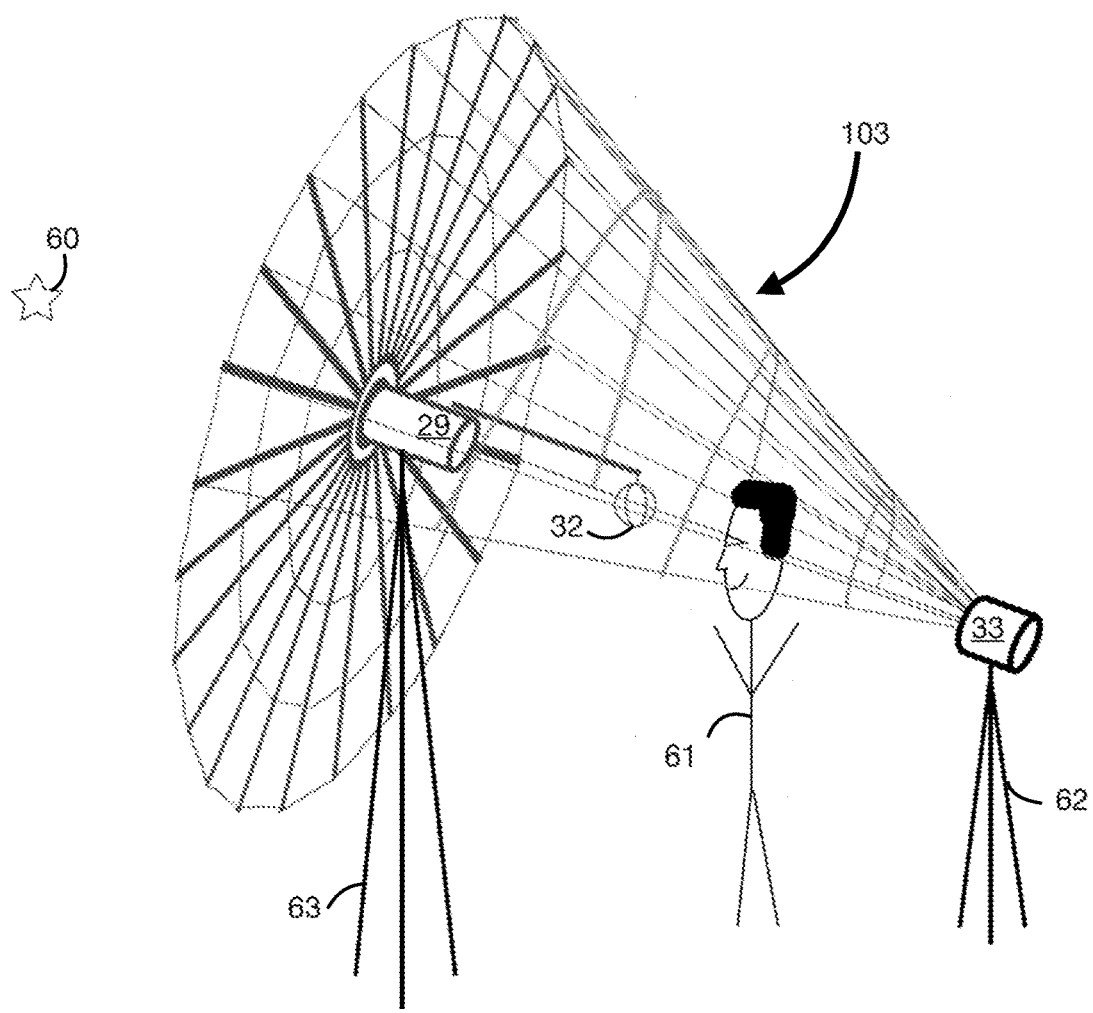
FIG. 6. is a full view of the invention in FIG. 1 as it would be properly calibrated by an astronomy enthusiast 61 to view the North Star 60. The Sky Dial is supported by a large tripod 63 and a small tripod 62 such that the conical net 103 is pulled taught. The vertex tube 33, viewing ball 32, and aiming tube 29 are all in line with the North Star 60.
Figure 7:
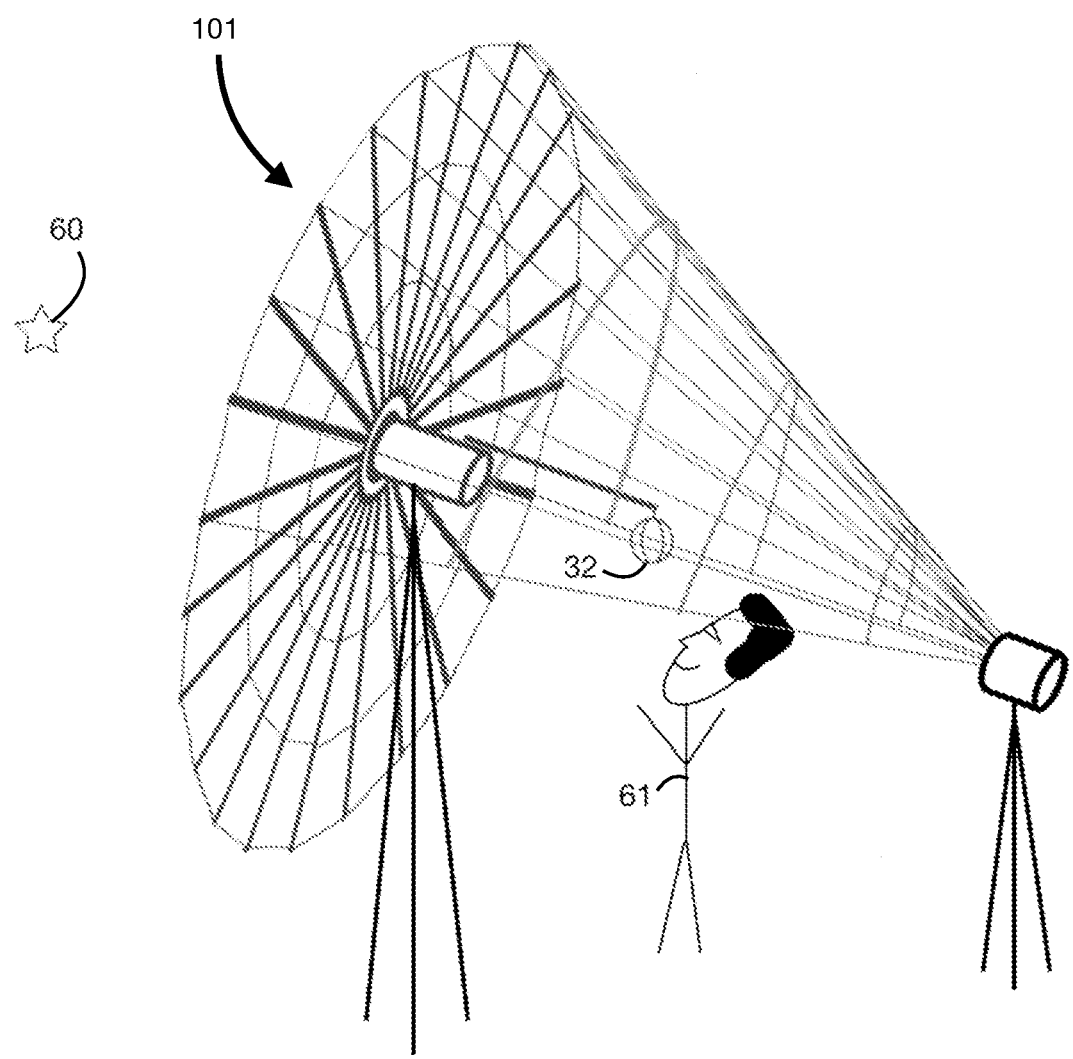
FIG. 7. is a full view of the Sky Dial as supported in FIG. 6, with the astronomy enthusiast 61 using the Sky Dial to identify the location of a celestial object viewable while looking up through the viewing ball 32 and the wheel 101. The North Star 60 also appears.
Figure 8:
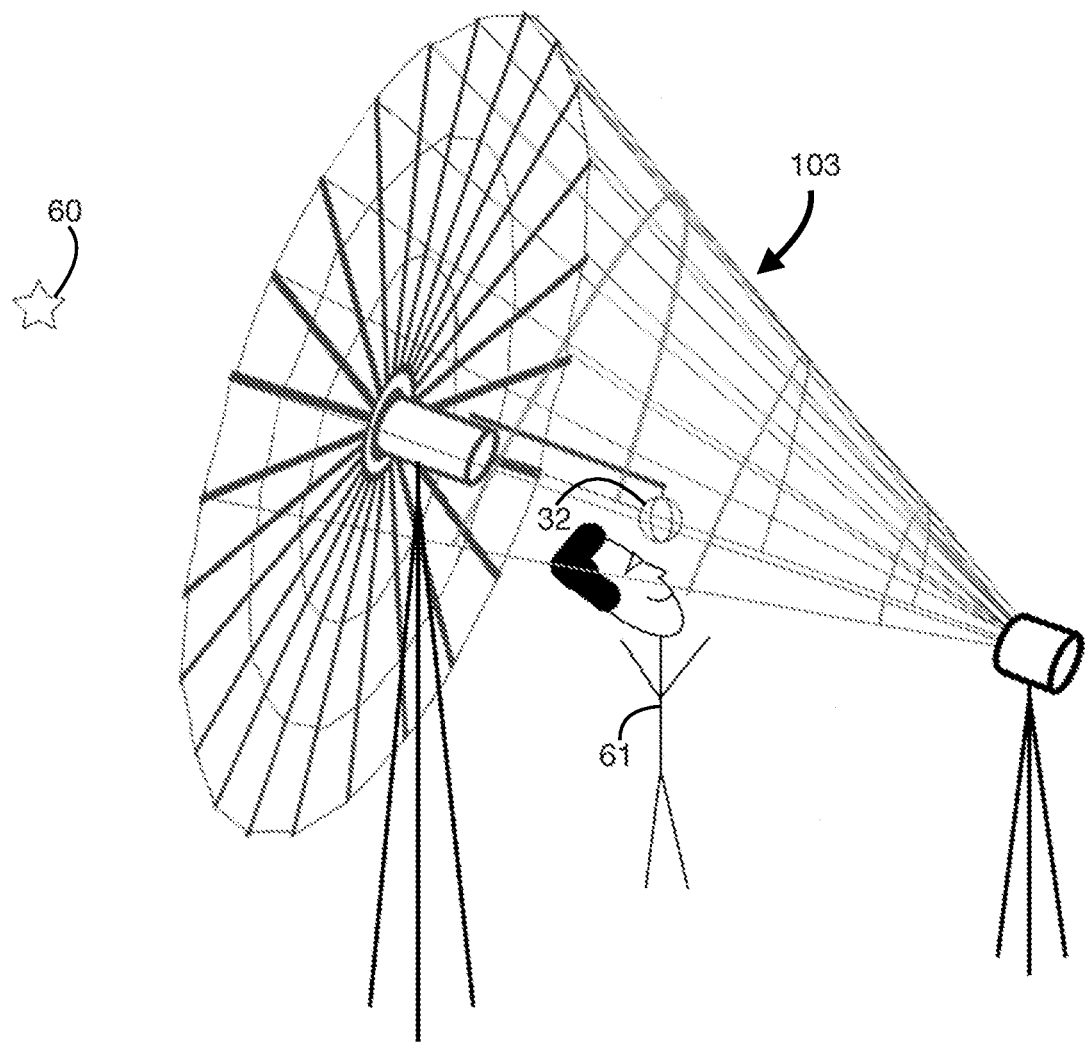
FIG. 8. is a full view of the Sky Dial as supported in FIG. 6, with the astronomy enthusiast 61 using the Sky Dial to identify the location of a celestial object viewable while looking upward through the viewing ball 32 and the conical net 103. The North Star 60 also appears.
Figure 9:
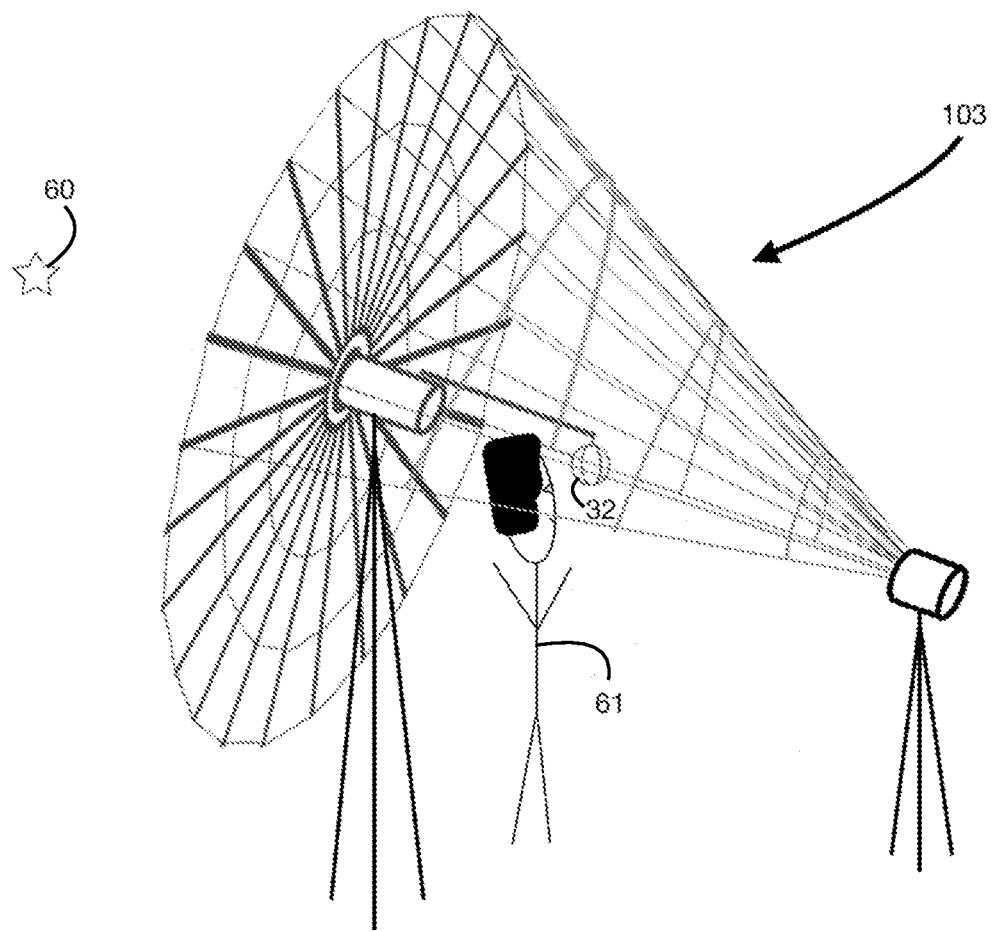
FIG. 9. is a full view of the Sky Dial as supported in FIG. 6, with the astronomy enthusiast 61 using the Sky Dial to identify the location of a celestial object viewable while looking sideways through the viewing ball 32 and the conical net 103. The North Star 60 also appears.
Figure 10:
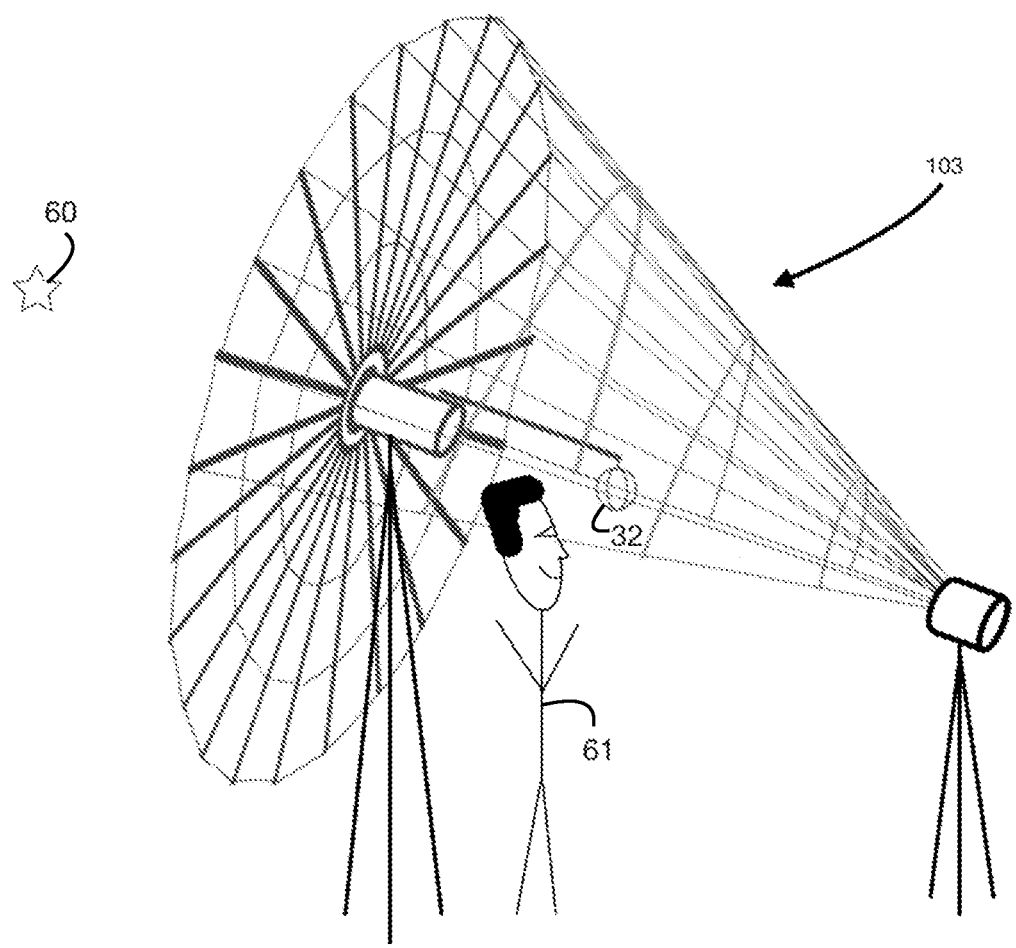
FIG. 10. is a full view of the Sky Dial as supported in FIG. 6, with the astronomy enthusiast 61 using the Sky Dial to identify the location of a celestial object viewable while looking backward through the viewing ball 32 and the conical net 103. The North Star 60 also appears.
Figure 11:
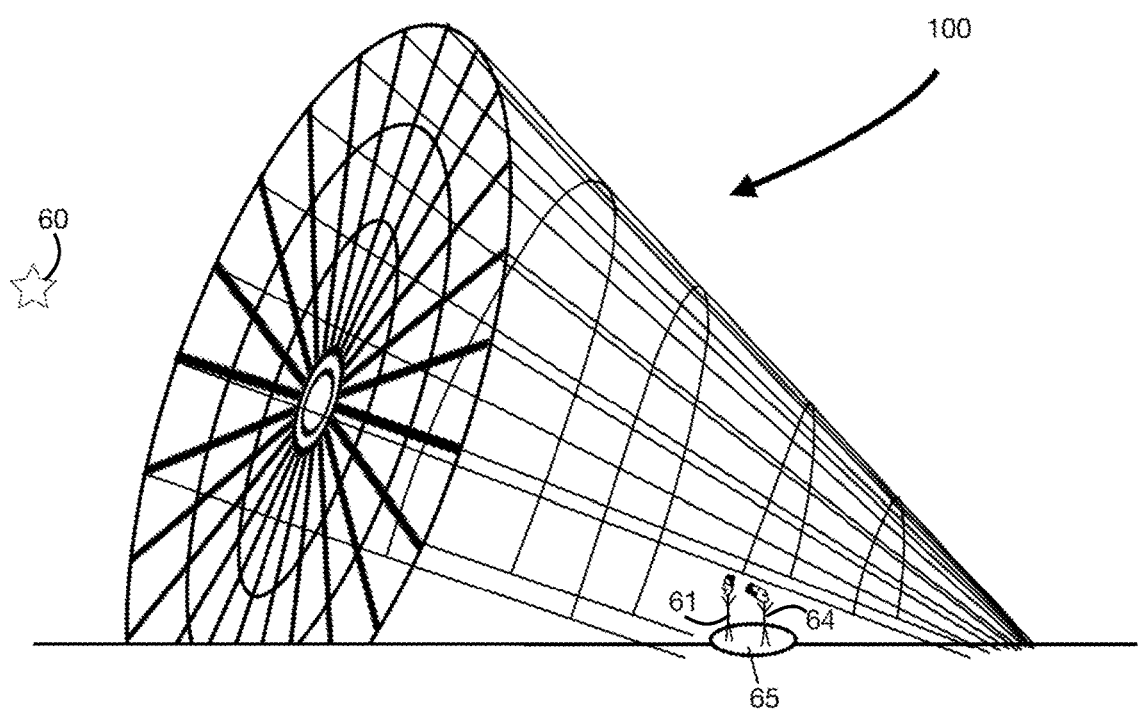
FIG. 11. illustrates a very large embodiment of a Sky Dial according to the invention wherein the Sky Dial is sufficiently large enough to allow a plurality of people to use the invention at the same time. In this embodiment, astronomy enthusiasts 61 and 64 are using the sky dial properly by standing in the viewing area 65 and looking thru the Sky Dial.

The preferred embodiment of the invention has three main parts: the wheel 101, the viewing assembly 102, and the conical net 103.

The wheel 101 is made up of a tube collar 25, twenty-four hour spokes 1-24, and three wheel cross strings 26, 27, and 28.

The diameter of this wheel 101 can vary in size and is used to determine the size of and position of the other parts of the this embodiment of the invention. A standard size of the wheel 101 could be six feet in diameter. The tube collar 25 forms the center core of the wheel 101 with twenty-four hour spokes 1-24. The hour spokes 1-24 are evenly spaced, separated by fifteen degrees (24×15=360).

The inner diameter of the tube collar 25 and the outer diameter of the aiming tube 29 should be such that the aiming tube 42 fits snugly into the tube collar 29.

After the tube collar 25 and the twenty-four hour spokes 1-24 are assembled, the outer wheel cross string 28 is connected to the tips of each of the twenty-four hour spokes. The middle wheel cross string 27 is connected to each of the twenty-four hour spokes 1-24 at two thirds the radius of the wheel 101. The inner wheel cross string 26 is connected to each of the twenty-four hour spokes 1-24 at one third the radius of the wheel 101.

The viewing assembly 102 consists of an aiming tube 29, a viewing ball 32, and support stick 30 and support string 31.

The viewing ball 32 is shaped by two interlocked rings of the same size, forming a sort of hollow sphere.

The support stick 30 is attached to the outer edge of the aiming tube 29.

The support string 31 connects to the support stick 30 one one end and connects to the viewing ball 32 on the other end such that the viewing ball 32 is then suspended exactly in line with the center of aiming tube 29.

The conical net 103 consists of fifteen hour strings 34-48, one vertex tube 33, and three conical net cross strings 49, 50, 51.

The fifteen hour strings 34-48 are equal in length (approximately 6' 10" for a 6" diameter wheel). The hour strings 34-48 extend from the outer tips of the fifteen hour spokes 1-7 and 17-24 to the vertex tube 33. The vertex tube 33 is positioned exactly six feet (one diameter of the wheel 101) from the center of the wheel 101 and perpendicular to the hour spokes 1-24.

The conical net cross strings 49, 50, 51 run between and are attached to each of the adjacent hour strings 34-48 at uniform distances from the vertex tube 33. The vertex tube 33 is the same diameter as the aiming tube 29.

Setup, Alignment, and Aiming

1) Mount the viewing assembly 102 to the large tripod 63 and aim it such that the North Star 60 can be seen when looking through the viewing ball 32 and then through the aiming tube 29.
2) Slip the wheel collar 25 around the other end of the aiming tube 29.
3) Mount the vertex tube 33 on a smaller tripod 62 positioning the vertex tube 33 six feet from the center of the wheel 101. The vertex tube 33, the viewing ball 32, the aiming tube 29, and the North Star 60 should all be aligned. The invention is aligned properly when you can look through the vertex Tube 33, the viewing ball 32, and the aiming tube 29 and see the North Star 60. Once aligned, the Sky Grid remains stationary and can be used to monitor any celestial object.

USING THE INVENTION

When the invention is set up and aligned, a person can gaze through said viewing ball 32 in any skyward direction at any distant object past the hour spokes 1-15 or hour strings 34-48 and wheel cross strings 26,27,28 or conical net cross strings 49,50,51 and can define the position of that distant object by noting between which of the twenty-four hour spokes 1-24 or fourteen hour strings 34-48 the object appears, and between which of the wheel cross strings 26,27,28 or conical net cross strings 49,50,51 it appears.

Hours later, the person can use the Sky Dial to record new location of the same celestial object and see that the celestial object has traversed a number of hour spokes or hour strings is exactly equal to the number of hour between readings.

What is claimed is:

1. A celestial observatory comprising:
   an aiming tube;
   a wheel formed by twenty-four hour spokes of equal length and patterned in a geometric plane, extending outward from one end of said aiming tube, perpendicular to the length of said aiming tube, and evenly fanned out at fifteen degree intervals;
   a vertex tube positioned in line with a aiming tube;
   a set of fifteen hour strings equal in length and extending from the outer tips of the said twenty-four hour spokes to said vertex tube; and
   a viewing ball comprised of a plurality of crossed rings positioned between and in line with said aiming tube and said vertex tube,
   whereby a person gazing through said viewing ball can see a distant object past the hour spokes and hour strings, and can describe the position of that distant object by noting between which of the twenty-four hour spokes or fifteen hour strings the object appears.

2. The celestial observatory of claim 1, in which the twenty-four spaces created by said hour spokes and hour strings are divided into a rings outlined by cross-strings running between adjacent hour spokes where each cross-string is connected to the hour spokes at a uniform distance from the center of said wheel, and other cross-strings run between said hour strings at a uniform distance from the vertex tube,
   whereby a person gazing through said viewing ball can see distant objects, past the cross-strings and can describe the position of those objects by noting in which ring the objects appear.

3. The celestial observatory of claim 2, wherein the aiming tube, viewing ball, and the vertex tube are all aligned with the North Star; whereby a person gazing through said viewing ball can see distant objects past said hour spokes, hour strings, and wheel cross-strings and conical net cross strings, and can describe the position of those objects by noting between which cross strings the objects appear and between which of the hour spokes or hour strings the objects appear.

4. The celestial observatory of claim 2, wherein a person can observe the position of a celestial objects at two points in time and realize that the celestial object appeared in the same ring during both observations and has moved about said axis, and that the number of hours elapsed between the first and second observation is equal to the number of hour spokes or hour strings the celestial object traversed during that time.

5. The celestial observatory of claim 1, wherein it is so large that said viewing ball is large enough to allow a plurality of people to reside within the space of the viewing ball, allowing those people to use the observatory simultaneously.

6. The celestial observatory of claim 1 in which the hour spokes of the wheel fold up like a collapsible umbrella to make it easier to collapse, transport and set up.

* * * * *